United States Patent
Goto et al.

(10) Patent No.: US 9,302,534 B2
(45) Date of Patent: Apr. 5, 2016

(54) AUTOMOBILE WHEEL

(75) Inventors: Yoshifumi Goto, Toyota (JP); Kaoru Ichikawa, Toyota (JP)

(73) Assignee: Central Motor Wheel Co., Ltd., Anjo-Shi (JP)

(*) Notice: Subject to any disclaimer, the term of this patent is extended or adjusted under 35 U.S.C. 154(b) by 13 days.

(21) Appl. No.: 14/386,103

(22) PCT Filed: Apr. 24, 2012

(86) PCT No.: PCT/JP2012/060928
§ 371 (c)(1),
(2), (4) Date: Sep. 18, 2014

(87) PCT Pub. No.: WO2013/160999
PCT Pub. Date: Oct. 31, 2013

(65) Prior Publication Data
US 2015/0102656 A1    Apr. 16, 2015

(51) Int. Cl.
*B60B 3/10* (2006.01)
*B60B 1/10* (2006.01)
(Continued)

(52) U.S. Cl.
CPC ... *B60B 3/10* (2013.01); *B60B 1/10* (2013.01); *B60B 3/007* (2013.01); *B60B 3/04* (2013.01); *B60B 3/041* (2013.01); *B60B 2900/311* (2013.01); *B60Y 2200/10* (2013.01)

(58) Field of Classification Search
CPC ............ B60B 3/007; B60B 3/02; B60B 3/04; B60B 3/041; B60B 3/044; B60B 3/045; B60B 3/10; B60B 1/06; B60B 1/08; B60B 1/10; B60B 1/14
USPC ........ 301/64.101, 64.102, 63.109, 65, 66, 67, 301/73, 74, 79, 80
See application file for complete search history.

(56) References Cited

U.S. PATENT DOCUMENTS 7,922,260 B2 * 4/2011 Rodrigues ............... B60B 3/002
 301/63.101
8,596,726 B2 * 12/2013 Kondo .................... B60B 3/007
 301/63.103

(Continued)

FOREIGN PATENT DOCUMENTS

JP   2004-001704 A1   1/2004
JP   2005-509552 A1   4/2005
(Continued)

OTHER PUBLICATIONS

International Search Report and Written Opinion (Application No. PCT/JP2012/060928) dated Jul. 24, 2012.

*Primary Examiner* — John Walters
(74) *Attorney, Agent, or Firm* — Burr & Brown, PLLC

(57) ABSTRACT

Each spoke portion (50) includes a center valley portion (51), and spoke projecting threads (52) formed on both sides of the center valley portion (51). Each of the spoke projecting threads (52) includes an inclined surface portion (54), which protrudes outward in a spoke widthwise direction from a top (53) and inclines downward to a wheel axially back side. The inclined surface portion (54) is formed so that a length thereof in a range of from the top (53) to an outer end of the inclined surface portion (54) in the spoke widthwise direction becomes larger toward a spoke distal end side, and that an average downward inclination angle thereof becomes smaller toward the spoke distal end side. With this configuration, it is possible to increase rigidity of the spoke portion with good balance while avoiding interference with a braking device.

3 Claims, 11 Drawing Sheets

(51) Int. Cl.
*B60B 3/04* (2006.01)
*B60B 3/00* (2006.01)

(56) References Cited

U.S. PATENT DOCUMENTS

| | | |
|---|---|---|
| 2003/0178887 A1 | 9/2003 | de A. Sereno |
| 2005/0017570 A1 | 1/2005 | Alff et al. |
| 2010/0253134 A1 | 10/2010 | Sano et al. |
| 2010/0289323 A1 | 11/2010 | Sano et al. |
| 2011/0193405 A1 | 8/2011 | Kihara et al. |
| 2011/0210602 A1 | 9/2011 | Goto |
| 2012/0217792 A1 | 8/2012 | Nakayama et al. |
| 2013/0140874 A1 | 6/2013 | Fukaya |

FOREIGN PATENT DOCUMENTS

| | | |
|---|---|---|
| JP | 2007-038097 A1 | 2/2007 |
| JP | 2009-113798 A1 | 5/2009 |
| WO | 2009/051230 A1 | 4/2009 |
| WO | 2010/053150 A1 | 5/2010 |
| WO | 2011/055839 A1 | 5/2011 |
| WO | 2011/074065 A1 | 6/2011 |
| WO | 2012/039194 A1 | 3/2012 |

* cited by examiner

AUTOMOBILE WHEEL

TECHNICAL FIELD

The present invention relates to an automobile wheel formed by joining a wheel disc and a wheel rim together.

BACKGROUND ART

Hitherto, a two-piece type automobile wheel including a wheel disc and a wheel rim is integrally formed in such a manner that an outer peripheral surface of a disc flange portion formed on an outer periphery of the wheel disc is fitted and welded on an inner peripheral surface of the wheel rim. As the above-mentioned automobile wheel, as proposed in, for example, Patent Literature 1, there has been known an automobile wheel having a plurality of spokes formed in the wheel disc. In the wheel disc of the automobile wheel, the plurality of spoke portions are extended equiangularly to a wheel radially outer side from an outer peripheral edge of a hub mounting portion to be coupled to a hub of an axle, and the plurality of spoke portions couple the hub mounting portion and the disc flange portion together. With this configuration, in the wheel disc, there are formed substantially triangular openings (ornamental holes) each being surrounded by the adjacent spoke portions and the disc flange portion.

In the automobile wheel proposed in Patent Literature 1, both end portions of each of the spoke portions in a widthwise direction are bent into an L-shape in cross-section, and those bent portions serve as reinforcing portions for reinforcing each of the spoke portions. Further, a connecting portion for connecting the reinforcing portions of the adjacent spoke portions is formed on an outer periphery of the hub mounting portion. The connecting portion continuously connects together the widthwise left reinforcing portion of one of the adjacent spokes and the widthwise right reinforcing portion of another one of the adjacent spokes. Further, each of the spoke portions is formed into such a tapered shape that a width thereof becomes narrower toward a distal end side in a radial direction, and the distal end of each of the spoke portions is folded to a wheel axially back side to be connected to the disc flange portion.

CITATION LIST

Patent Literature

[PTL 1] JP 2009-113798 A

SUMMARY OF INVENTION

However, the automobile wheel proposed in Patent Literature 1 has room for improvement in view of rigidity balance. In the automobile wheel, the reinforcing portion formed on each side of the spoke portion is coupled to the connecting portion at the hub mounting portion, and hence, on a proximal end side (side close to the hub mounting portion) of the spoke portion, high rigidity can be obtained. Meanwhile, on a distal end side (side close to the disc flange portion) of the spoke portion, the tapered distal end is folded to the wheel axially back side to be connected to the disc flange portion, and hence rigidity is reduced on the distal end side as compared to the proximal end side. As a result, the automobile wheel cannot attain high rigidity.

The present invention has been made in order to solve the above-mentioned problem, and has an object to reduce imbalance of rigidity of spoke portions in a radial direction, to thereby increase rigidity of the automobile wheel.

In order to achieve the above-mentioned object, the feature of the present invention resides in an automobile wheel, including:
  a wheel rim (10) for supporting beads of a tire; and
  a wheel disc (20) including:
    a hub mounting portion (40) to be coupled to a hub of an axle;
    a disc flange portion (30) connected to an inner peripheral surface of the wheel rim; and
    a plurality of spoke portions (50) extended from the hub mounting portion to a wheel radially outer side so as to couple the hub mounting portion and the disc flange portion together,
  the hub mounting portion, the disc flange portion, and the plurality of spoke portions being formed integrally with each other,
  each of the plurality of spoke portions including:
    a center valley portion (51) formed at a center position of the each of the plurality of spoke portions in a spoke widthwise direction so as to extend in a wheel radial direction; and
    spoke projecting threads (52) arranged side by side on both sides of the center valley portion in the spoke widthwise direction so that a cross-section of each of the spoke projecting threads in the spoke widthwise direction projects to a wheel axially front side in a mountain shape,
  the each of the plurality of spoke portions being formed so that a separation distance between tops (53) of the spoke projecting threads arranged side by side on the both sides of the center valley portion is narrower on a spoke distal end side than on a spoke proximal end side,
  the each of the spoke projecting threads including an inclined surface portion (54), which protrudes outward in the spoke widthwise direction from each of the tops projecting to the wheel axially front side and inclines downward to a wheel axially back side,
  the inclined surface portion being formed so that a length of the inclined surface portion in a range of from the each of the tops to an outer end of the inclined surface portion in the spoke widthwise direction becomes larger toward the spoke distal end side, and that an average downward inclination angle of the inclined surface portion becomes smaller toward the spoke distal end side.

The automobile wheel according to the present invention includes the wheel rim and the wheel disc, and is integrally formed in such a manner that the disc flange portion of the wheel disc is connected to the inner peripheral surface of the wheel rim. The wheel disc includes the plurality of spoke portions that are extended from the hub mounting portion to the wheel radially outer side so as to couple the hub mounting portion and the disc flange portion together.

Each of the spoke portions includes the center valley portion formed at the center position of each of the spoke portions in the spoke widthwise direction so as to extend in the wheel radial direction, and the spoke projecting threads arranged side by side on the both sides of the center valley portion in the spoke widthwise direction so that the cross-section of each of the spoke projecting threads in the spoke widthwise direction projects to the wheel axially front side in a mountain shape. The cross-section in the spoke widthwise direction refers to a cross-section cut along a plane that is directed in a widthwise direction (widthwise direction orthogonal to a spoke axis) of each of the spoke portions and is parallel to a wheel axis.

Each of the spoke projecting threads includes the inclined surface portion, which protrudes outward in the spoke widthwise direction from each of the tops projecting to the wheel axially front side and inclines downward to the wheel axially back side. Further, each of the spoke portions is formed so that the separation distance between the tops of the spoke projecting threads arranged side by side on the both sides of the center valley portion is narrower on the spoke distal end side than on the spoke proximal end side. The wheel axially front side refers to a front side (outer side in a vehicle widthwise direction when the automobile wheel is mounted to a hub of an axle) in a direction of a rotation center axis of the automobile wheel, and the wheel axially back side refers to a back side (inner side in the vehicle widthwise direction when the automobile wheel is mounted to the hub of the axle) in the direction of the rotation center axis of the automobile wheel.

The spoke projecting threads are formed on the both sides of the center valley portion in this manner, and thus rigidity of each spoke portion can be increased. However, in a case where the spoke portion is formed so that the separation distance between the tops of the spoke projecting threads is narrower on the spoke distal end side than on the spoke proximal end side, the automobile wheel is excellent in design, but reduced in rigidity on the spoke distal end side than on the spoke proximal end side. In this context, in the present invention, the inclined surface portion is formed so that the length of the inclined surface portion in the range of from each of the tops to the outer end of the inclined surface portion in the spoke widthwise direction becomes larger toward the spoke distal end side, and that the average downward inclination angle of the inclined surface portion becomes smaller toward the spoke distal end side.

The length of the inclined surface portion in the range of from each of the tops to the outer end of the inclined surface portion in the spoke widthwise direction (hereinafter referred to as "inclined surface length") becomes larger toward the spoke distal end side, and thus rigidity of the distal end side of each spoke portion can be increased. Further, the distal end of the spoke portion and the disc flange portion can be firmly coupled together. However, in a case where the inclined surface length merely becomes larger toward the spoke distal end side, there is a problem in that the inclined surface portion and a braking device provided on a back side of the wheel disc may interfere with each other on the spoke distal end side. In this context, in the present invention, the inclined surface portion is formed so that the average downward inclination angle thereof becomes smaller toward the spoke distal end side. That is, inclination of the inclined surface portion becomes gentler toward the spoke distal end side. The average downward inclination angle refers to an average inclination angle of the inclined surface portion with respect to a plane orthogonal to the wheel axis. With this, the inclined surface length and the average downward inclination angle can be changed with good balance. Even when the inclined surface length becomes larger toward the spoke distal end side, it is possible to satisfactorily avoid interference between the inclined surface portion and the braking device.

Consequently, according to the present invention, rigidity of the spoke portions can be increased with good balance while avoiding interference with the braking device. Accordingly, in the automobile wheel including the spoke portions, each of which is formed so that the separation distance between the spoke projecting threads is narrower on the spoke distal end side than on the spoke proximal end side, rigidity balance can be particularly improved satisfactorily.

Note that, the inclined surface portion may be shaped into a curved surface bulging to the wheel axially front side, shaped into a curved surface dented to the wheel axially back side, or shaped into a flat surface having no curved portion.

Another feature of the present invention resides in that the wheel disc is formed so that the disc flange portion is positioned on the wheel axially front side with respect to the hub mounting portion, and that the center valley portion of the each of the plurality of spoke portions is formed so as to incline upward to the wheel axially front side in a region from the spoke proximal end side to the spoke distal end side.

According to the present invention, the wheel disc is formed so that the disc flange portion is positioned on the wheel axially front side with respect to the hub mounting portion. Therefore, the center valley portion of each of the spoke portions can be formed so as to incline upward to the wheel axially front side in the region from the spoke proximal end side to the spoke distal end side. In a case where the center valley portion is formed in this manner, the center valley portion on the spoke distal end side can be arranged at a position distant from the braking device. Therefore, it is possible to more easily avoid interference with the braking device.

Another feature of the present invention resides in that the each of the plurality of spoke portions is formed so that a projecting length extending to the wheel axially front side in a range of from a deepest position of the center valley portion to the each of the tops in the cross-section in the spoke widthwise direction is smaller on the spoke distal end side than on the spoke proximal end side.

According to the present invention, each of the spoke portions is formed so that the projecting length extending to the wheel axially front side in the range of from the deepest position (position corresponding to the wheel axially back-most side) of the center valley portion to each of the tops in the cross-section in the spoke widthwise direction is smaller on the spoke distal end side than on the spoke proximal end side. Therefore, the inclined surface length of the inclined surface portion can be increased toward the spoke distal end side while preventing the tops from extremely projecting to the wheel axially front side with respect to the wheel rim.

Note that, it is preferred that the projecting length extending to the wheel axially front side in the range of from the deepest position of the center valley portion to each of the tops become smaller toward the spoke distal end side. In this case, a projecting length of each of the tops can be gradually decreased along with upward inclination of the center valley portion inclining to the wheel axially front side.

Note that, in the above description, in order to help understanding of the present invention, reference symbols used in the following embodiment are added in parentheses to components of the invention corresponding to components described in the embodiment, but the respective components of the invention are not limited to those of the embodiment designated by the reference symbols.

DESCRIPTION OF EMBODIMENT

Figure 1:
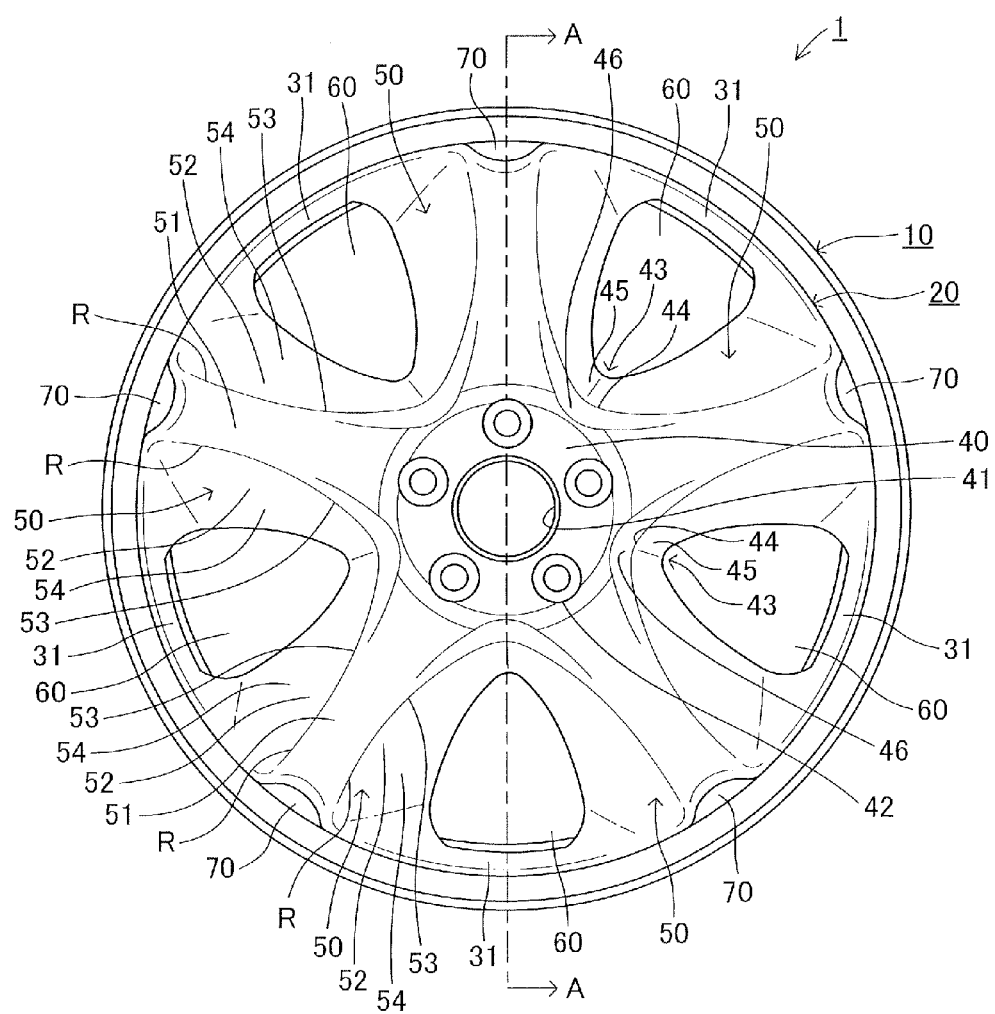
FIG. 1 is a front view of an automobile wheel according to an embodiment of the present invention.
Figure 2:
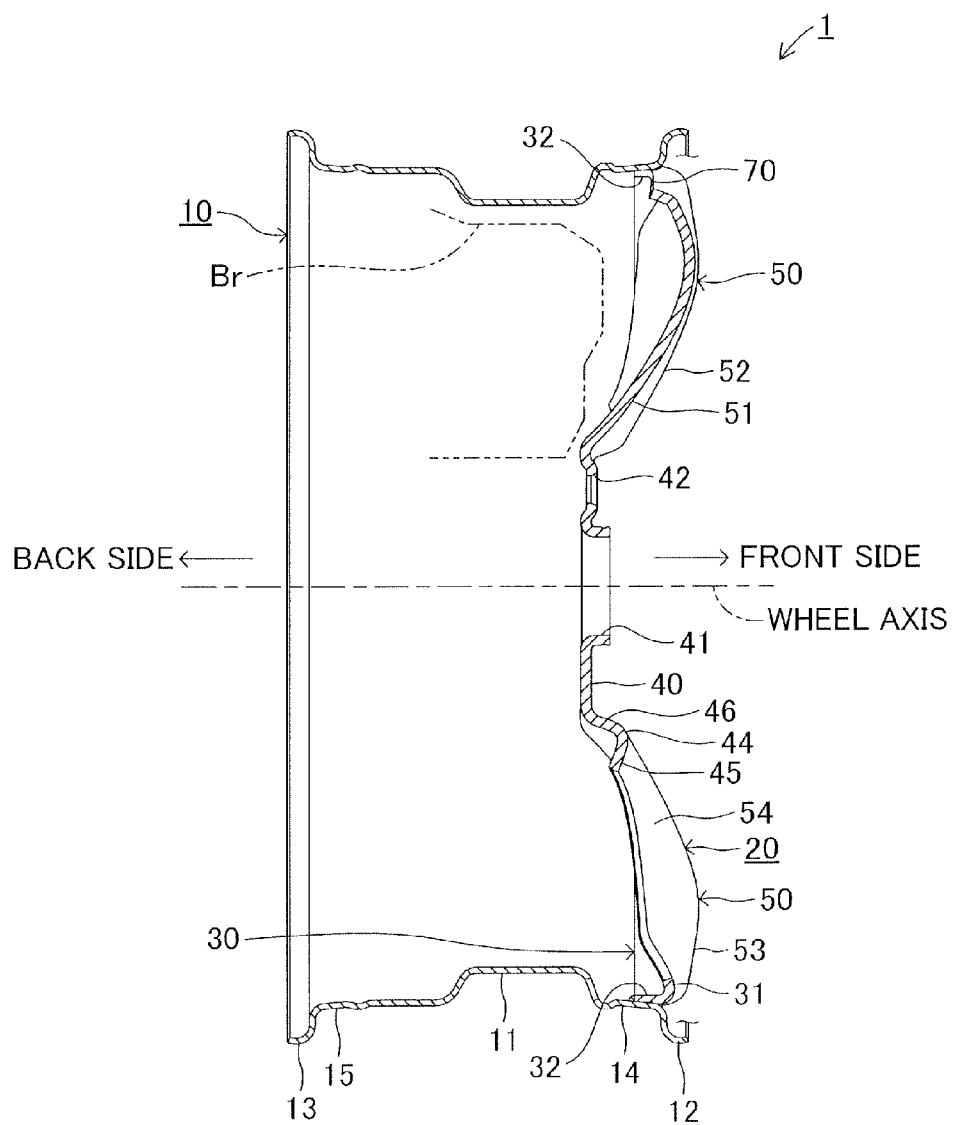
FIG. 2 is a cross-sectional view taken along the line A-A of FIG. 1.
Figure 3:
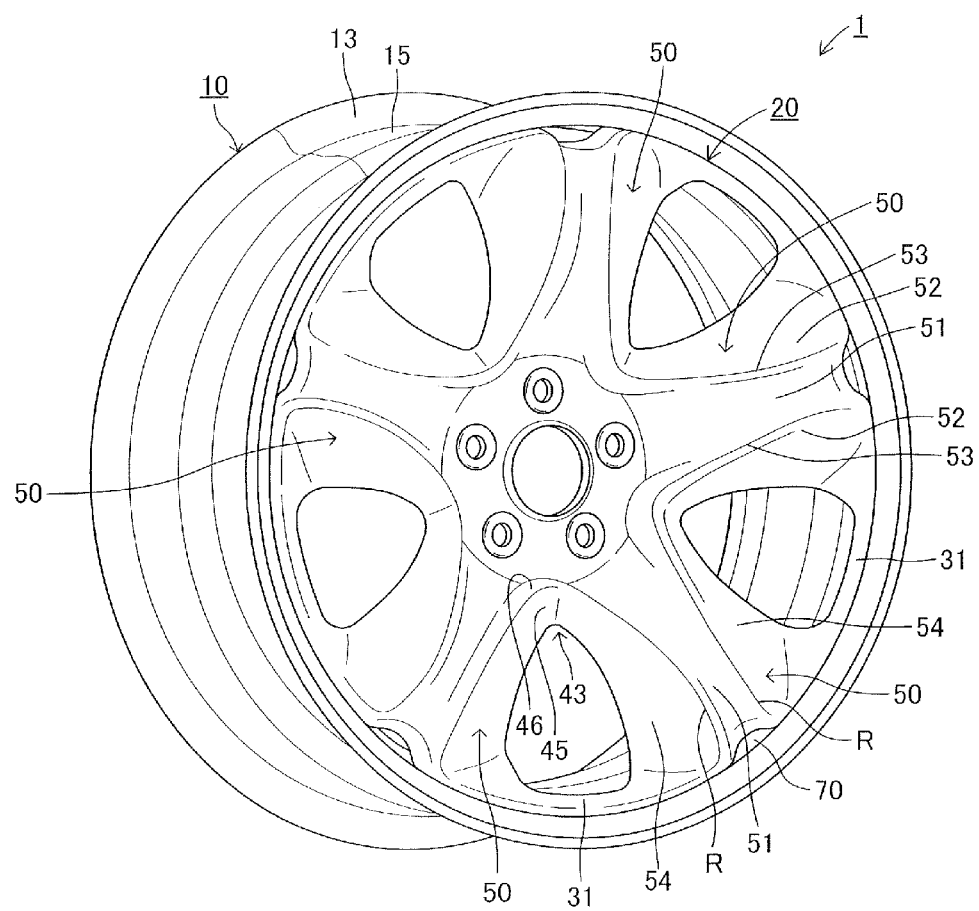
FIG. 3 is a perspective view of the automobile wheel.
Figure 4:
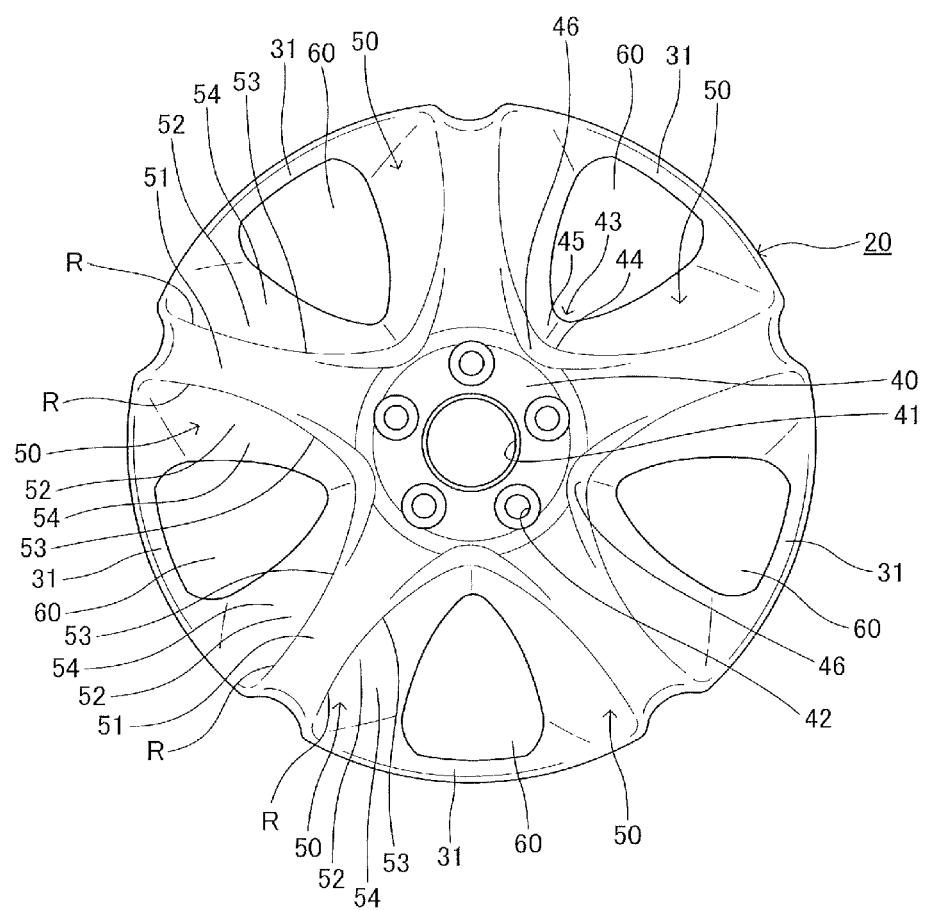
FIG. 4 is a front view of a wheel disc.
Figure 5:
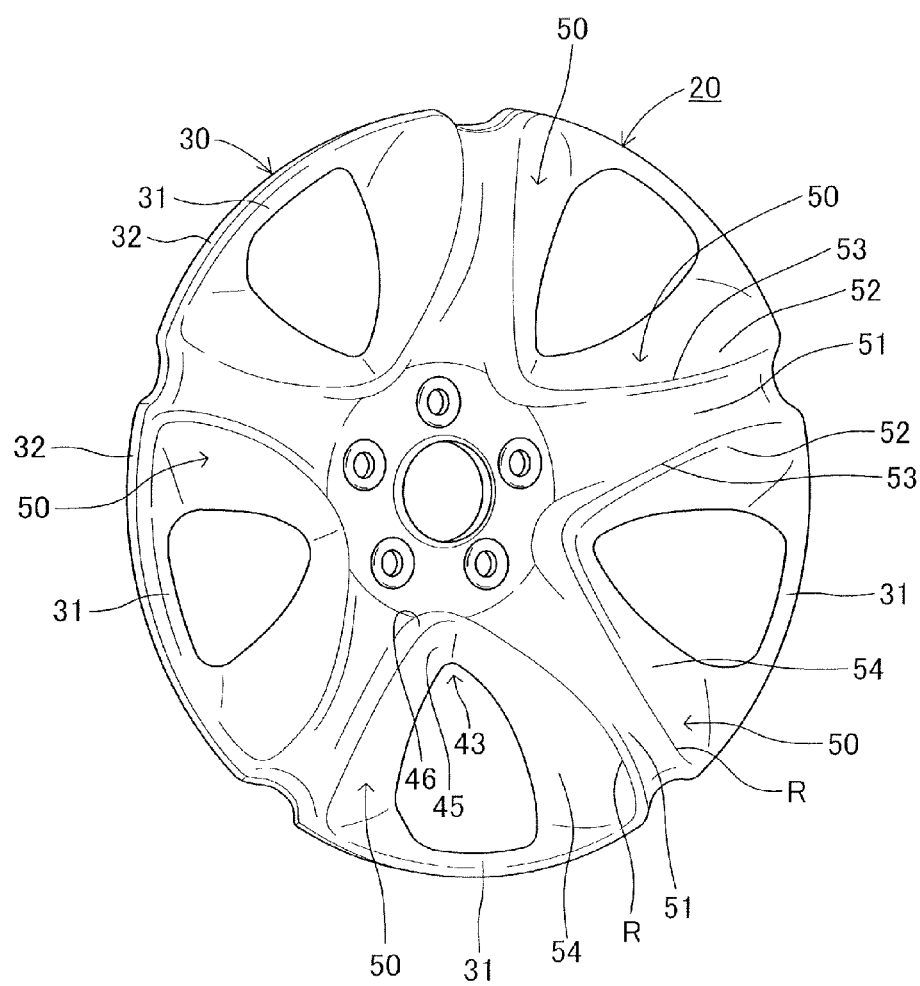
FIG. 5 is a perspective view of the wheel disc.
Figure 10:
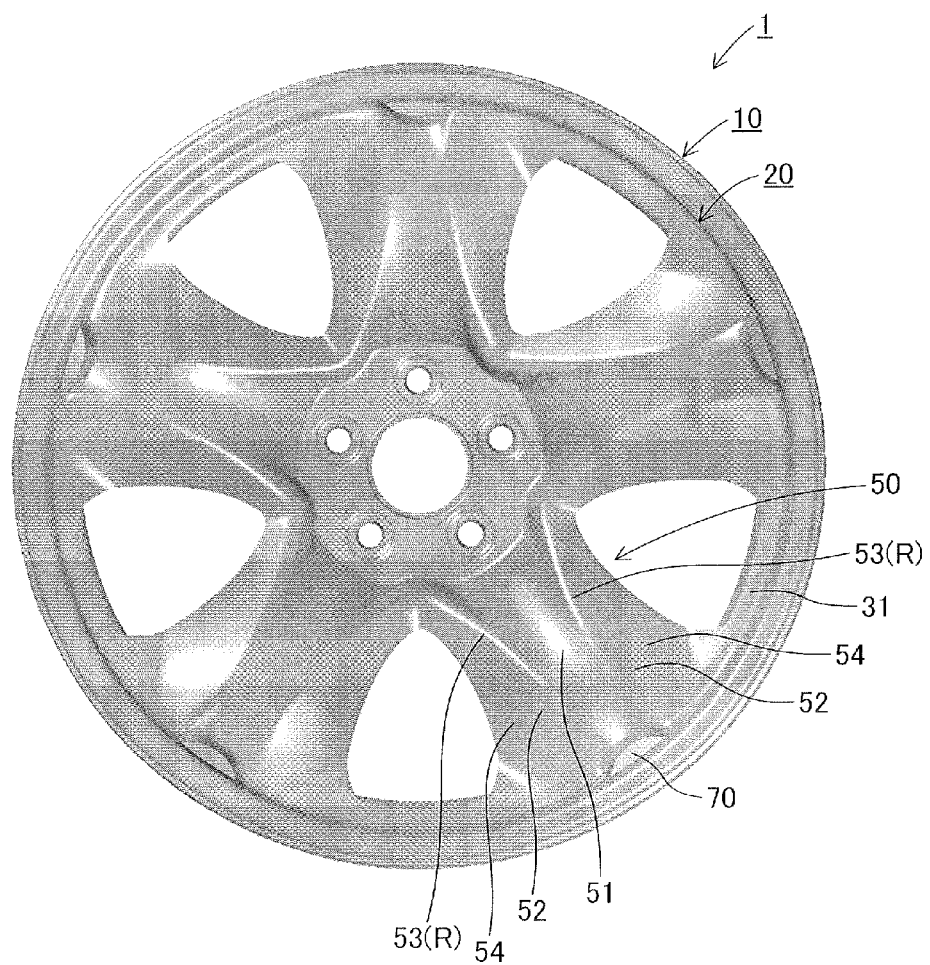
FIG. 10 is a front view illustrating a curved shape of the automobile wheel using shading.
Figure 11:
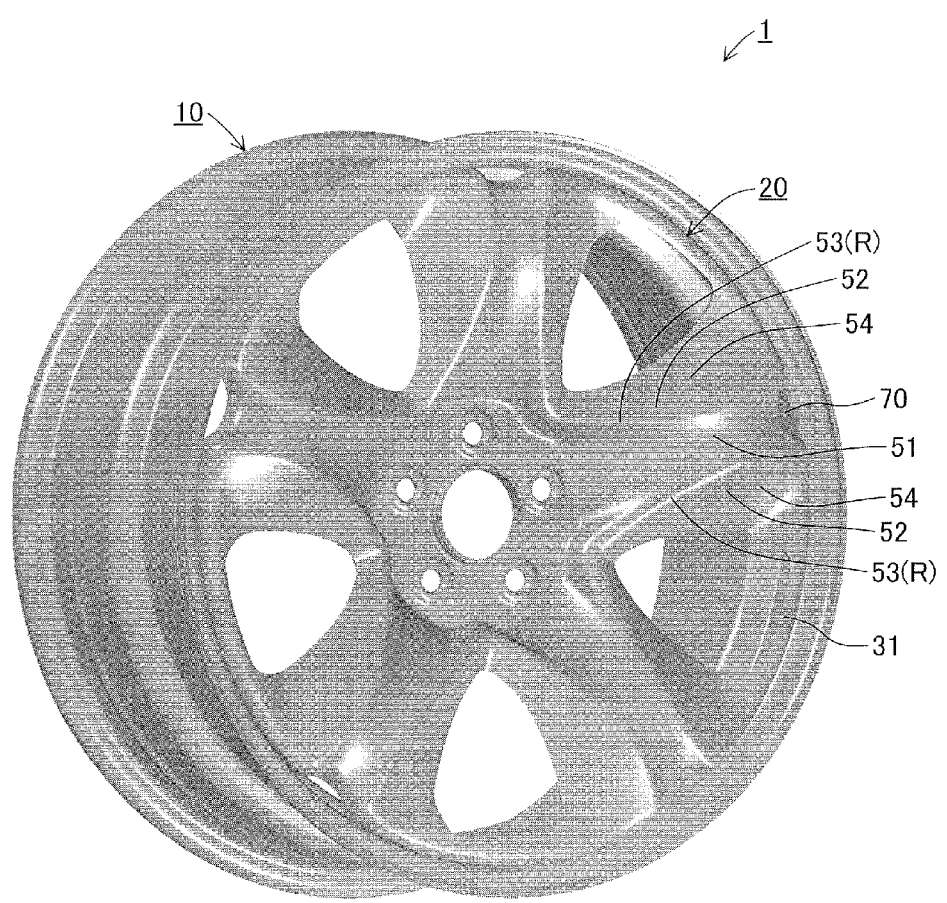
FIG. 11 is a perspective view illustrating the curved shape of the automobile wheel using shading.

Now, an embodiment of the present invention is described in detail with reference to the drawings. FIGS. 1 to 3 and FIGS. 10 and 11 illustrate an automobile wheel according to this embodiment. FIGS. 4 and 5 illustrate a wheel disc as a component of the automobile wheel according to this embodiment. Note that, FIGS. 10 and 11 illustrate a curved shape of the automobile wheel of FIGS. 1 and 3 using shading, respectively. An automobile wheel 1 is a steel wheel of a two-piece type including a wheel rim 10 formed by butt welding and shaping a steel flat plate, and a wheel disc 20 similarly formed by shaping a steel flat plate. As illustrated in FIG. 2, the automobile wheel 1 is integrally formed in such a manner that, after a flange portion 30 (hereinafter referred to as "disc flange portion 30") of the wheel disc 20 is fitted on an inner peripheral surface of the wheel rim 10, a distal end region of the disc flange portion 30 is joined to the inner peripheral surface of the wheel rim 10 by a variety of welding methods such as arc welding, spot welding, and laser welding. In the automobile wheel 1 illustrated in FIG. 2, the left side of FIG. 2 corresponds to a back side of the automobile wheel 1, that is, a side to be mounted to a hub of an axle, and the right side of FIG. 2 corresponds to a front side of the automobile wheel 1, that is, an aesthetic surface side.

A rotation center axis of the automobile wheel 1 is hereinafter referred to as a wheel axis, and a direction of the wheel axis is hereinafter referred to as a wheel axial direction. In particular, a direction toward the front side (right arrow direction of FIG. 2) in the direction of the wheel axis is referred to as a wheel axially front side, and a direction toward the back side (left arrow direction of FIG. 2) in the direction of the wheel axis is referred to as a wheel axially back side. Further, a direction orthogonal to the wheel axis is referred to as a radial direction. In particular, a direction moving away from the wheel axis is referred to as a wheel radially outer side, and a direction approaching the wheel axis is referred to as a wheel radially inner side.

As illustrated in FIG. 2, a front-side rim flange 12 and a back-side rim flange 13 for supporting side wall portions of a tire are formed at both ends of the wheel rim 10, respectively. A cylindrical front-side bead seat portion 14 for seating a bead of the tire thereon is formed on the wheel axially back side of the front-side rim flange 12, whereas a cylindrical back-side bead seat portion 15 for seating a bead of the tire thereon is formed on the wheel axially front side of the back-side rim flange 13. A well portion 11, into which the beads of the tire are dropped at the time of mounting of the tire, is formed between the front-side bead seat portion 14 and the back-side bead seat portion 15. The well portion 11 is formed into a cylindrical shape dented to the wheel radially inner side with respect to the bead seat portions 14, 15. In the automobile wheel 1 according to this embodiment, an outer peripheral surface of the disc flange portion 30 of the wheel disc 20 is joined by welding on an inner peripheral surface of the front-side bead seat portion 14.

The wheel disc 20 is integrally formed by pressing a single steel flat plate, and includes a disc-like hub mounting portion 40 coupled to the hub of the axle, the disc flange portion 30 connected to the inner peripheral surface of the wheel rim 10, and a plurality of spoke portions 50 for coupling the hub mounting portion 40 and the disc flange portion 30 together. In the hub mounting portion 40, a hub hole 41 is formed in a center of the hub mounting portion 40, and a plurality of bolt holes 42 are formed around the hub hole 41 at equal intervals concyclically. In this embodiment, five bolt holes 42 are formed, but the number of the bolt holes 42 is not limited to five.

Five spoke portions 50 are formed equiangularly so as to extend from an outer periphery of the hub mounting portion 40 to the wheel radially outer side. In this embodiment, five spoke portions 50 are formed, but the number of the spoke portions 50 is not limited to five. An outer end of each spoke portion 50 in a wheel radial direction is coupled to the disc flange portion 30. With this configuration, there are formed openings 60 each having a substantially triangular shape in front view and being surrounded by the adjacent spoke portions 50 and the disc flange portion 30. In each spoke portion 50, a side to be coupled to the hub mounting portion 40 is hereinafter referred to as a proximal end side (a portion to be coupled to the hub mounting portion 40 is referred to as a proximal end portion), and a side to be coupled to the disc flange portion 30 is hereinafter referred to as a distal end side (a portion to be coupled to the disc flange portion 30 is referred to as a distal end portion). Note that, in this specification, the description: "couple" means not coupling between two components but continuous coupling, that is, coupling in shape.

As illustrated in FIG. 2, a position of the hub mounting portion 40 in the wheel axial direction is positioned on the wheel axially back side with respect to a position at which the disc flange portion 30 is connected to the inner peripheral surface of the wheel rim 10. Accordingly, each spoke portion 50 is curved and formed so as to swell to the wheel axially front side in a region from the proximal end side to the distal end side thereof. Each spoke portion 50 is bent at the distal end portion thereof to the wheel axially back side, and thus is coupled to the disc flange portion 30.

Each spoke portion 50 includes a center valley portion 51 formed at a center position in a spoke widthwise direction so as to extend in the wheel radial direction, and spoke projecting threads 52 arranged side by side on both sides of the center valley portion 51 in the spoke widthwise direction. The center valley portion 51 is bent from the outer periphery of the hub mounting portion 40 to the wheel axially front side so as to extend to the wheel radially outer side. As illustrated in FIG. 2, when cut in a plane containing the wheel axis, a cross-section of the center valley portion 51 bulges to the wheel axially front side, and the center valley portion 51 is formed into a slope shape inclining upward so that a position thereof in the wheel axial direction is shifted to the front side in a region from a spoke proximal end side to a spoke distal end side. Further, a distal end of the center valley portion 51 is not coupled to the disc flange portion 30, but is bent to the wheel axially back side at a position short of the disc flange portion 30. Further, the center valley portion 51 is formed so that a cross-section thereof in the spoke widthwise direction exhibits a curved surface dented to the wheel axially back side.

Figure 8:
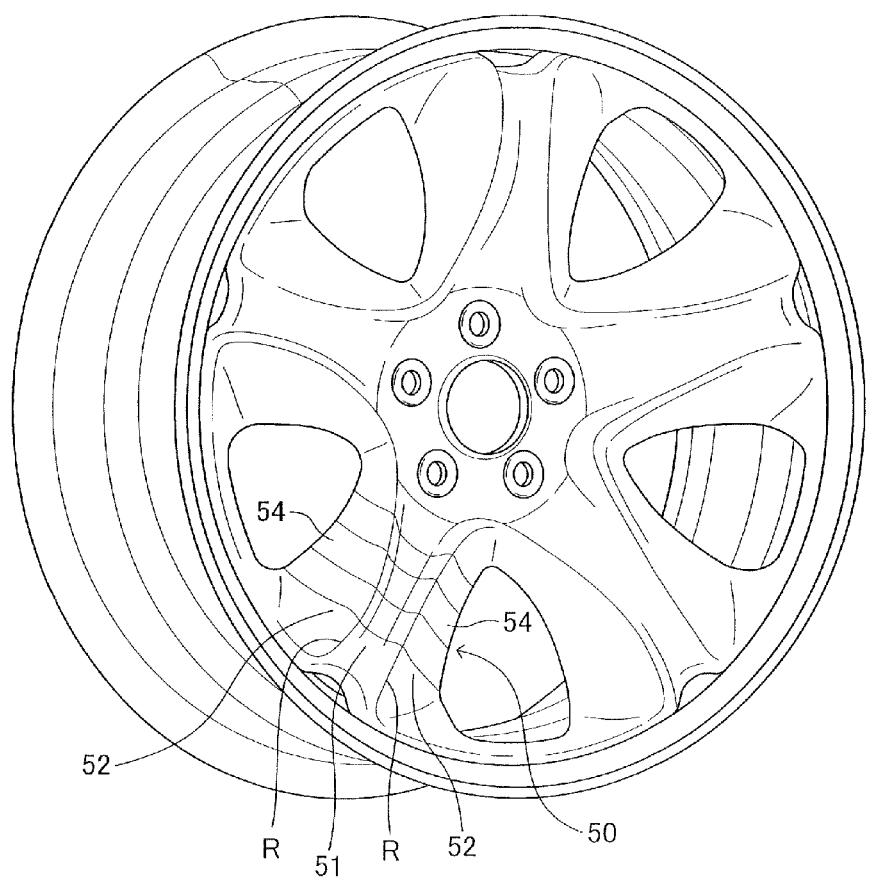
FIG. 8 is a perspective view of the automobile wheel, for illustrating a curved shape of each spoke portion.

The spoke projecting threads 52 are formed on the both sides of the center valley portion 51 in the spoke widthwise direction so as to extend in a forming direction (wheel radial direction) of the center valley portion 51. The spoke projecting threads 52 are formed on right and left sides of the center valley portion 51 so as to be bilaterally symmetrical with respect to the single spoke portion 50. FIG. 8 schematically illustrates a plurality of imaginary cut lines that appear on a surface of each spoke projecting thread 52 when cut along the spoke widthwise direction, for the purpose of illustrating an image of a curved surface shape of the center valley portion 51 and the spoke projecting thread 52.

Each spoke projecting thread 52 is bent and formed so that a cross-section thereof in the spoke widthwise direction projects to the wheel axially front side in a mountain shape. Therefore, a ridgeline R, on which a top 53 projecting to the wheel axially front side extends continuously, is formed along the wheel radial direction on each side of the center valley portion 51 in the spoke widthwise direction. Note that, the cross-section in the spoke widthwise direction represents a cross-section cut along each of the cut lines (lines B-B, C-C, and D-D) of FIG. 6, and refers to a cross-section cut along a plane that is directed in a widthwise direction orthogonal to a spoke axis and is parallel to a wheel axis.

Each spoke projecting thread 52 and the center valley portion 51 are formed continuously with each other, and hence there is no boundary therebetween (there is no boundary between a peak and a valley). Thus, a widthwise center portion of each spoke portion 50 corresponds to the center valley portion 51, and a portion projecting to the wheel axially front side with respect to the center valley portion 51 and an outer portion in the spoke widthwise direction with respect to the top 53 of the projecting portion correspond to the spoke projecting thread 52. A range surrounded by the ridgelines R of the tops 53 on both sides is hereinafter referred to as the center valley portion 51, and the top 53 and the outer portion in the spoke widthwise direction with respect to the top 53 are hereinafter referred to as the spoke projecting thread 52.

In each spoke projecting thread 52, there is formed an inclined surface portion 54 that is bent at the ridgeline R of the top 53 so as to protrude outward in the spoke widthwise direction. The inclined surface portion 54 is formed into an inclined surface that inclines downward from the ridgeline R of the top 53 to the wheel axially back side. Each spoke portion 50 is formed so that a projecting length of the spoke projecting thread 52 with respect to the center valley portion 51 (in other words, a depth of the center valley portion 51 or a height of the top 53), a width of the center valley portion 51, a position of the center valley portion 51 in the wheel axial direction, an inclination angle of the inclined surface portion 54, and a length of the inclined surface portion 54 in a range of from the top 53 to an outer end of the inclined surface portion in the spoke widthwise direction (hereinafter referred to as "inclined surface length") vary depending on a position of the spoke portion 50 in the wheel radial direction.

Figure 6:
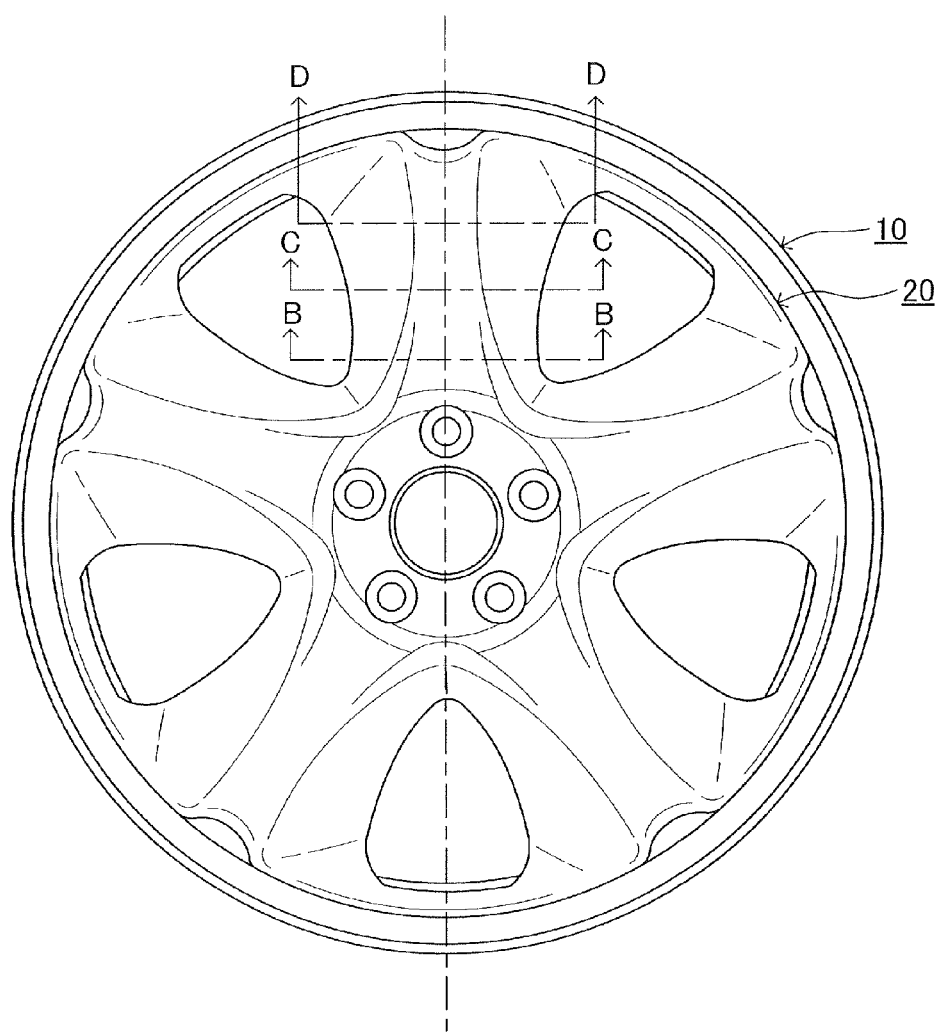
FIG. 6 is a front view of the wheel disc, for illustrating cut lines.
Figure 7:
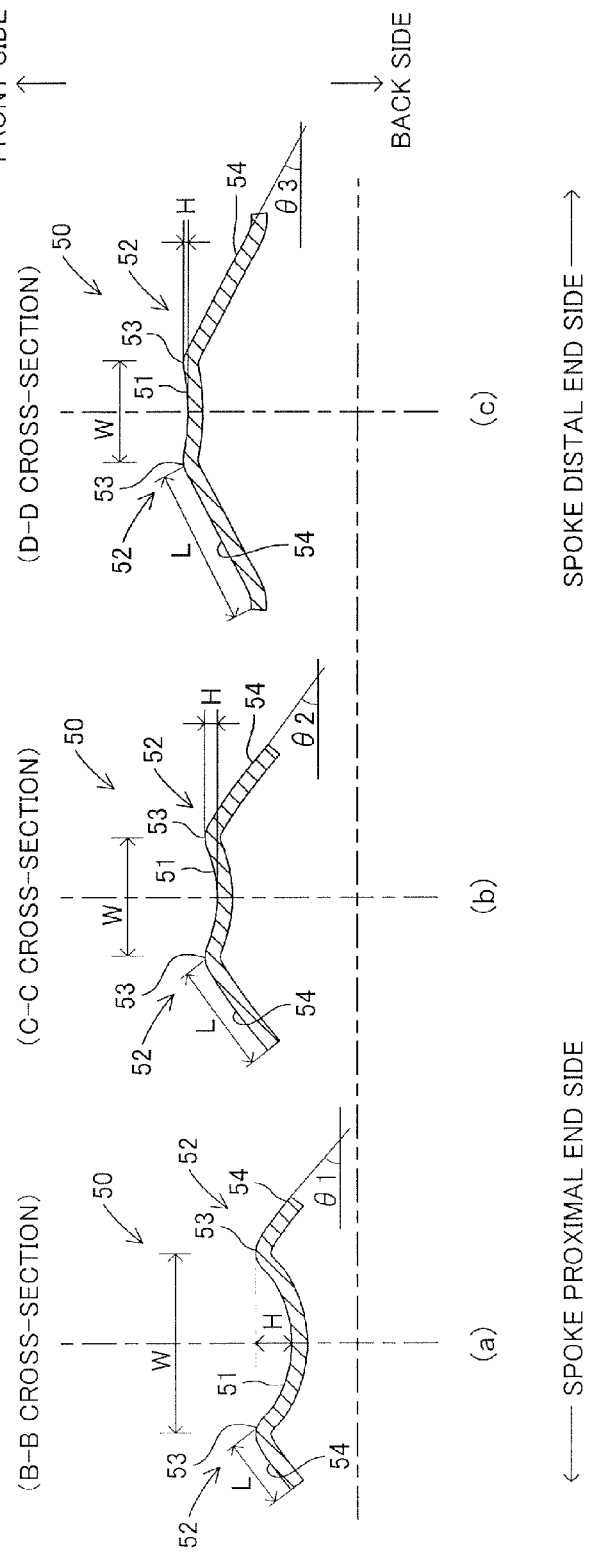
FIG. 7 are widthwise cross-sectional views of a spoke portion taken along the cut lines of FIG. 6.

FIG. 7 illustrate cross-sections of the spoke portion 50 (cross-sections in the spoke widthwise direction) cut along the cut lines (lines B-B, C-C, and D-D) of FIG. 6. In FIG. 7, a transverse axis indicated by the chain line represents a position of a hub mounting surface in the wheel axial direction. As illustrated in FIGS. 2 and 7, a projecting length H extending to the wheel axially front side in a range of from the deepest position of the center valley portion 51 (intermediate position in the spoke widthwise direction) to the top 53 of each spoke projecting thread 52 is set to be largest at a spoke proximal end portion and to become smaller toward the spoke distal end side. Note that, at a spoke distal end portion, the center valley portion 51 is bent to the wheel axially back side at the position short of an outer peripheral end of the wheel disc 20, and hence description of the projecting length H is omitted.

Further, as illustrated in FIGS. 2 and 7, a width W of the center valley portion 51 (in other words, a separation distance W between the tops 53 formed on the both sides of the center valley portion 51) is set to be narrower on the spoke distal end side than on the spoke proximal end side. In this embodiment, in a range of from the spoke proximal end portion toward a spoke intermediate portion (intermediate position of each spoke portion 50 in the wheel radial direction), the width W of the center valley portion becomes narrower toward the spoke distal end side, and the width W of the center valley portion 51 is substantially constant (the ridgelines R of the tops are substantially parallel to each other) on the distal end side with respect to the spoke intermediate portion.

Further, as illustrated in FIGS. 2 and 7, a position of the center valley portion 51 in the wheel axial direction is set to be on the wheel axially backmost side at the spoke proximal end portion, and to be shifted to the wheel axially front side toward the spoke distal end portion. Therefore, as illustrated in FIG. 2, the center valley portion 51 is formed into a slope shape inclining upward to the wheel axially front side in a region from the spoke proximal end side to the spoke distal end side. Note that, at the spoke distal end portion, the center valley portion 51 is bent to the wheel axially back side at the position short of the outer peripheral end of the wheel disc 20, and hence the upward inclination ends at the position short of the outer peripheral end. In this embodiment, the upward inclination of the center valley portion 51 starts from the spoke proximal end portion, and has a length that is equal to or larger than a half of a spoke length extending from the spoke proximal end portion to the spoke distal end portion.

Further, the inclination angle of the inclined surface portion 54 is set to be largest at the spoke proximal end portion and to become smaller toward the spoke distal end side. The inclination angle refers to an angle with respect to a plane orthogonal to the wheel axis. The inclined surface portion 54 according to this embodiment has a substantially flat plate surface, but is slightly curved. Accordingly, the inclination angle means an average inclination angle of the inclined surface. As illustrated in FIG. 7, when comparing the inclination angle at the spoke proximal end portion, the inclination angle at the spoke intermediate portion, and the inclination angle at the spoke distal end portion in the cross-sections in the spoke widthwise direction, an inclination angle $\theta 1$ at the spoke proximal end portion, an inclination angle $\theta 2$ at the spoke intermediate portion, and an inclination angle $\theta 3$ at the spoke distal end portion have a relationship of $\theta 1 > \theta 2 > \theta 3$. Further, the inclination angle does not steeply change, and the inclination angle is set to become gradually smaller toward the spoke distal end side (inclination becomes gentler). Further, on the spoke distal end side, the inclined surface portion 54 is bent so as to be smoothly coupled to a disc outer peripheral portion 31 described later.

Further, the length (inclined surface length) of the inclined surface portion 54 in the range of from the top 53 to the outer end of the inclined surface portion 54 in the spoke widthwise direction is set to become larger toward the spoke distal end side. As illustrated in each of FIG. 7, the inclined surface length is represented by a length L of the inclined surface extending from the top 53 to the outer end of the inclined surface portion 54 in the spoke widthwise direction in the cross-section in the spoke widthwise direction. In FIG. 7, the inclined surface length L at the spoke proximal end portion, the inclined surface length L at the spoke intermediate portion, and the inclined surface length L at the spoke distal end portion are compared to one another, but the inclined surface length L is set to become gradually larger toward the spoke distal end side.

Figure 9:
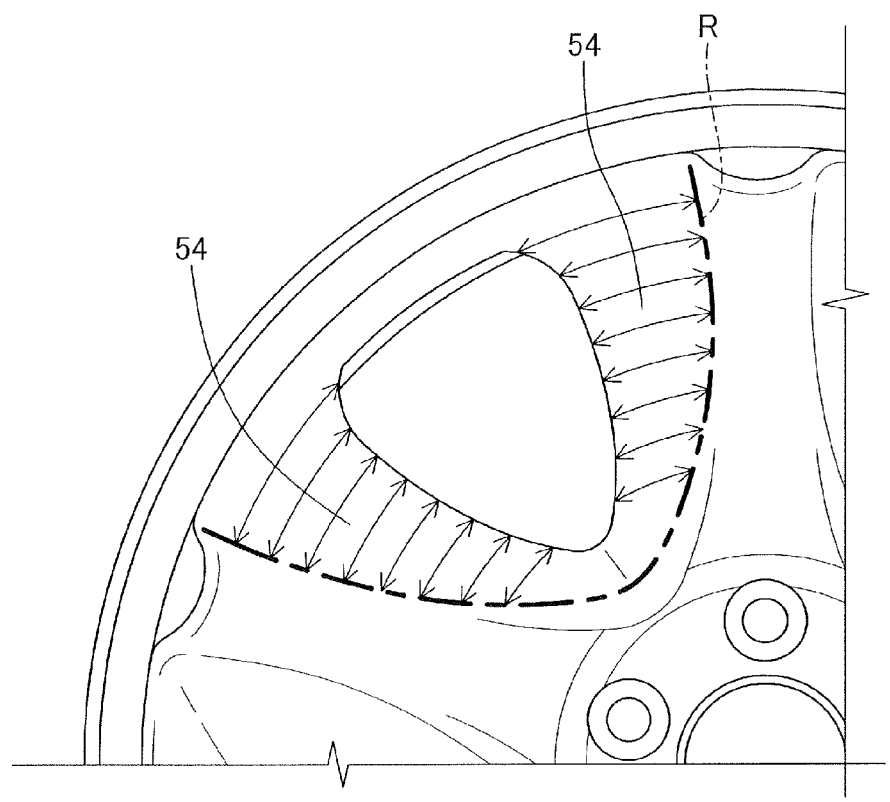
FIG. 9 is an explanatory view illustrating a dimension of each inclined surface portion of the spoke portion protruding in a circumferential direction.

Note that, when defining a relationship between the length of the inclined surface portion 54 in the range of from the top 53 to the outer end of the inclined surface portion 54 in the spoke widthwise direction and a radial position (position in a direction of the spoke axis) of each spoke portion 50, it is not always necessary to use the length of the inclined surface extending from the top 53 to the outer end of the inclined surface portion 54 in the spoke widthwise direction, which is measured in a widthwise direction orthogonal to the spoke axis as illustrated in FIG. 7. For example, as illustrated in FIG. 9, a length of the inclined surface extending in the circumferential direction about the wheel axis from the top 53 to the outer end of the inclined surface portion 54 in the spoke widthwise direction may be referred to as the inclined surface length, and the above-mentioned relationship may be defined by using a relationship between the inclined surface length and the position in the direction of the spoke axis. Also in this case, the inclined surface length of the inclined surface portion 54 is set to become gradually larger toward the spoke distal end side. Therefore, the description in the present invention: "the length in the range of from the top to the outer end of the inclined surface portion 54 in the spoke widthwise direction becomes larger toward the spoke distal end side" encompasses a configuration in which the length of the inclined surface extending from the top to the outer end of the inclined surface portion in the direction orthogonal to the spoke axis becomes gradually larger toward the spoke distal end side, and a configuration in which the length of the inclined surface extending in the circumferential direction about the wheel axis from the top to the outer end of the inclined surface portion becomes larger toward the spoke distal end side.

On the outer peripheral side of the hub mounting portion 40, there are formed spoke projecting thread coupling portions 43 each configured to couple together the spoke projecting threads 52 facing each other across the opening 60, that is, a right spoke projecting thread 52 of one of the adjacent spoke portions 50 and a left spoke projecting thread 52 of another one of the adjacent spoke portions 50. The spoke projecting thread coupling portion 43 has the same cross-sectional shape as that of each spoke projecting thread 52 at the proximal end portion of each spoke portion 50. The spoke projecting thread coupling portion 43 includes a top 44, a coupling inclined surface portion 45 inclining downward in a region from the top 44 toward the opening 60, and an inner inclined surface portion 46 inclining downward in a region from the top 44 toward a flat surface of the hub mounting portion 40.

The top 44 is coupled to the tops 53 of the spoke projecting threads 52, the coupling inclined surface portion 45 is coupled to the inclined surface portions 54 of the right and left spoke projecting threads 52, and the inner inclined surface portion 46 is coupled to the center valley portions 51 of the right and left spoke portions 50. With this configuration, the spoke projecting thread coupling portion 43 integrally couples together one of the spoke projecting threads 52 and another one of the spoke projecting threads 52, which face each other across the opening 60, in a V-shaped manner when viewed from the wheel axial direction (in front view).

The distal end of each of the spoke portions 50 is coupled to the disc flange portion 30. The disc flange portion 30 includes the disc outer peripheral portions 31 and a fitting portion 32. Each disc outer peripheral portion 31 is visible in front view, and couples together the distal ends of the adjacent spoke portions 50 in the circumferential direction, to thereby form the outer periphery of the wheel disc 20. Similarly to the inclined surface portion 54 of each spoke projecting thread 52, the disc outer peripheral portion 31 protrudes to the opening 60, and is shaped into, as illustrated in FIG. 2, an inclined surface inclining downward to the wheel axially back side and inward in the wheel radial direction. The inclined surface portion 54 of the spoke projecting thread 52 is smoothly and integrally coupled to the disc outer peripheral portion 31 through adjustment of inclination of the inclined surface portion 54 at a widthwise distal end thereof so that the inclined surface portion 54 has the same inclination angle as the inclination angle of the disc outer peripheral portion 31 on the spoke distal end side.

The spoke portions 50 and the disc outer peripheral portions 31 are bent at the outer peripheral end of the wheel disc 20 and extended to the wheel axially back side. The portions extended to the wheel axially back side serve as the fitting portion 32. The center valley portion 51 of each of the spoke portions 50 is bent at the position short of the outer peripheral end of the wheel disc 20 (on the wheel radially inner side) to the wheel axially back side. Accordingly, the fitting portion 32 is formed into an annular body that is coaxial with the wheel axis, and is shaped so as to be cut out at a position corresponding to the center valley portion 51.

As illustrated in FIG. 2, the outer peripheral surface of the fitting portion 32 is fitted on the inner peripheral surface of the front-side bead seat portion 14 of the wheel rim 10, and the fitting portion 32 is connected at the distal end thereof to the inner peripheral surface of the front-side bead seat portion 14 by welding.

When the wheel disc 20 is joined to the wheel rim 10 in this manner, in the outer periphery (outer periphery in front view) of the wheel disc 20, openings 70 are formed at portions at which the wheel rim 10 and the wheel disc 20 are not connected to each other. That is, the openings 70 are formed at the portions at which the center valley portions 51 are bent to the wheel axially back side. The opening 70 functions as an opening for draining. The opening 70 is hereinafter referred to as a draining opening 70. According to the automobile wheel 1 of this embodiment, the outer peripheral surface of the fitting portion 32 is joined to the inner peripheral surface of the front-side rim flange 12, and hence depressions that collect water are formed between the well portion 11 and the wheel disc 20. However, the draining opening 70 is formed, thereby being capable of draining water out therethrough.

In order to form the draining opening 70, the spoke distal end portion of the center valley portion 51 is bent to the wheel axially back side at such a position that the bent portion of the center valley portion 51 is dented inward in the wheel radial direction so as to become deeper toward a center in the spoke widthwise direction. With this configuration, the spoke distal end portion of the center valley portion 51 is shaped into a circular-arc cutout in front view. Therefore, the draining opening 70 is formed and surrounded by the bent surface of the center valley portion 51 and the inner peripheral surface of the front-side bead seat portion 14.

According to the above-mentioned automobile wheel 1 of this embodiment, on each side of the center valley portion 51, the spoke projecting thread 52 is formed so that the cross-section thereof in the spoke widthwise direction projects to the wheel axially front side in a mountain shape, and hence rigidity of the entire spoke portions 50 can be increased. In addition, the length (inclined surface length) of the inclined surface portion 54 of the spoke projecting thread 52 in the range of from the top 53 to the outer end of the inclined surface portion 54 in the spoke widthwise direction becomes larger toward the spoke distal end side, and hence rigidity on the spoke distal end side can be particularly increased. Thus, imbalance of rigidity of the spoke portions 50 in the radial direction can be reduced. As a result, rigidity of the automobile wheel can be increased.

Further, when the inclined surface length of the inclined surface portion 54 is increased, there is a problem in that the outer end of the inclined surface portion 54 in the spoke widthwise direction and a braking device Br (indicated by the two-dot chain line of FIG. 2) may interfere with each other. However, the inclination angle of the inclined surface portion 54 becomes smaller toward the spoke distal end side, and hence inclination becomes gentler along with increase in the inclined surface length. Thus, it is possible to avoid interference with the braking device Br. In addition, the wheel disc 20 is formed so that the disc flange portion 30 is positioned on the wheel axially front side with respect to the hub mounting portion 40, and hence the entire spoke portions 50 are each formed into a shape swelling to the wheel axially front side toward the spoke distal end side. Accordingly, the center valley portion 51 of each of the spoke portions 50 is formed so as to incline upward to the wheel axially front side toward the spoke distal end side, and becomes more distant from the braking device Br toward the spoke distal end side. Therefore, it is possible to more easily avoid interference with the braking device Br. In this case, the projecting length extending to the wheel axially front side in the range of from the deepest position of the center valley portion 51 to the top 53 becomes smaller toward the spoke distal end side, and hence the inclined surface length of the inclined surface portion 54 can be increased toward the spoke distal end side while preventing the top 53 from extremely projecting to the wheel axially front side with respect to the wheel rim 10.

Further, each inclined surface portion 54 on the spoke distal end side is smoothly and integrally coupled to each disc outer peripheral portion 31, and hence no stepped portion (bent portion) is formed at a coupling portion between the inclined surface portion 54 and the disc outer peripheral portion 31. Therefore, each spoke portion 50 and the disc outer peripheral portion 31 can be firmly coupled together, and rigidity of the distal end side of the spoke portion 50 can be further increased. Accordingly, it is possible to form the draining opening 70 while keeping high rigidity.

Consequently, according to the automobile wheel 1 of this embodiment, rigidity of the distal end side of each of the spoke portions 50 can be increased with good balance while avoiding interference with the braking device Br. Particularly when each of the spoke portions 50 is formed so that a separation distance between the spoke projecting threads 52 is narrower on the spoke distal end side than on the spoke proximal end side, there is a problem of imbalance of rigidity. However, according to this embodiment, it is possible to satisfactorily solve this problem.

The automobile wheel according to this embodiment is described above, but the present invention is not limited to the above-mentioned embodiment. Various modifications may be made thereto without departing from the gist of the present invention.

For example, in this embodiment, a steel flat plate is used as a plate material for forming the wheel disc and the wheel rim. However, a flat plate made of, for example, aluminum, magnesium alloy, or titanium alloy may be also used.

Further, the automobile wheel according to this embodiment is an automobile wheel of a type in which the disc flange portion 30 is fitted on the inner peripheral surface of the front-side bead seat portion 14 of the wheel rim 10, but there may be adopted a type in which the disc flange portion 30 is fitted on the inner peripheral surface of the well portion 11. In this case, it is not necessary to form the draining openings 70.

Further, the inclined surface portion 54 of the spoke projecting thread 52 according to this embodiment is shaped into a curved surface approximate to a substantially flat surface. For example, the inclined surface portion 54 may be shaped into a curved surface bulging to the wheel axially front side, shaped into a curved surface dented to the wheel axially back side, or shaped into a flat surface having no curved portion.

The invention claimed is:

1. An automobile wheel, comprising:
a wheel rim for supporting beads of a tire; and
a wheel disc comprising:
   a hub mounting portion to be coupled to a hub of an axle;
   a disc flange portion connected to an inner peripheral surface of the wheel rim; and
   a plurality of spoke portions extended from the hub mounting portion to a wheel radially outer side so as to couple the hub mounting portion and the disc flange portion together,
   the hub mounting portion, the disc flange portion, and the plurality of spoke portions being formed integrally with each other,
each of the plurality of spoke portions comprising:
   a center valley portion formed at a center position of the each of the plurality of spoke portions in a spoke widthwise direction so as to extend in a wheel radial direction; and
   spoke projecting threads arranged side by side on both sides of the center valley portion in the spoke widthwise direction so that a cross-section of each of the spoke projecting threads in the spoke widthwise direction projects to a wheel axially front side in a mountain shape,
   the each of the plurality of spoke portions being formed so that a separation distance between tops of the spoke projecting threads arranged side by side on the both sides of the center valley portion is narrower on a spoke distal end side than on a spoke proximal end side,
the each of the spoke projecting threads comprising an inclined surface portion, which protrudes outward in the spoke widthwise direction from each of the tops projecting to the wheel axially front side and inclines downward to a wheel axially back side,
the inclined surface portion being formed so that a length of the inclined surface portion in a range of from the each of the tops to an outer end of the inclined surface portion in the spoke widthwise direction becomes larger toward the spoke distal end side, and that an average downward inclination angle of the inclined surface portion becomes smaller toward the spoke distal end side.

2. An automobile wheel according to claim 1,
wherein the wheel disc is formed so that the disc flange portion is positioned on the wheel axially front side with respect to the hub mounting portion, and
wherein the center valley portion of the each of the plurality of spoke portions is formed so as to incline upward to the wheel axially front side in a region from the spoke proximal end side to the spoke distal end side.

3. An automobile wheel according to claim 2, wherein the each of the plurality of spoke portions is formed so that a projecting length extending to the wheel axially front side in a range of from a deepest position of the center valley portion to the each of the tops in the cross-section in the spoke widthwise direction is smaller on the spoke distal end side than on the spoke proximal end side.

* * * * *